United States Patent
Dixon et al.

(10) Patent No.: US 7,679,501 B2
(45) Date of Patent: Mar. 16, 2010

(54) REMOTE INTERROGATION OF A VEHICLE WHEEL

(75) Inventors: Bryn James Dixon, Bletchley (GB); Victor Alexandrovich Kalinin, Headington (GB); John Peter Beckley, Bicester (GB)

(73) Assignee: Michelin Recherche et Technique S.A. (CH)

( * ) Notice: Subject to any disclaimer, the term of this patent is extended or adjusted under 35 U.S.C. 154(b) by 413 days.

(21) Appl. No.: 11/497,006

(22) Filed: Aug. 1, 2006

(65) Prior Publication Data

US 2007/0018805 A1 Jan. 25, 2007

Related U.S. Application Data

(63) Continuation of application No. PCT/GB2005/000349, filed on Feb. 1, 2005.

(30) Foreign Application Priority Data

Feb. 2, 2004 (GB) ................... 0402240.6

(51) Int. Cl.
- *B60C 23/00* (2006.01)
- *G08B 13/14* (2006.01)
- *H04Q 1/32* (2006.01)
- *H01Q 1/04* (2006.01)

(52) U.S. Cl. .............. 340/447; 340/572.1; 343/711; 343/719

(58) Field of Classification Search ......... 340/442–448, 340/572.1–572.9, 665; 73/146.2–146.8; 343/711, 719, 720

See application file for complete search history.

(56) References Cited

U.S. PATENT DOCUMENTS

| 4,067,235 | A   |   | 1/1978  | Markland et al.          |
|-----------|-----|---|---------|--------------------------|
| 4,782,342 | A   | * | 11/1988 | Walton ............ 340/941 |
| 5,289,160 | A   |   | 2/1994  | Fiorletta                |
| 6,016,129 | A   | * | 1/2000  | Lauper ............ 343/867 |
| 6,147,659 | A   | * | 11/2000 | Takahashi et al. ..... 343/866 |
| 6,285,858 | B1  | * | 9/2001  | Yoshida ............ 455/41.2 |
| 6,549,125 | B2  | * | 4/2003  | Nigon et al. ........ 340/447 |
| 6,894,233 | B2  | * | 5/2005  | Dingwall et al. ..... 177/210 C |

(Continued)

FOREIGN PATENT DOCUMENTS

EP     1 223 057 A2     7/2002

(Continued)

OTHER PUBLICATIONS

International Search Report, PCT/GB2005/000349 dated Mar. 5, 2005.

*Primary Examiner*—Jennifer Mehmood
(74) *Attorney, Agent, or Firm*—Frank J. Campigotto; E. Martin Remick; Kurt J. Fugman

(57) ABSTRACT

The present invention relates to a method and apparatus for assessing the condition of a wheel particularly, but not exclusively, to a method and apparatus for assessing the condition of a tire rotating on a vehicle wheel. Apparatus is provided comprising a plurality of antennas (101, 102, 103, 104, 105, 106, 107, 108) for transmitting an interrogation signal to a sensor (110, 112), the sensor being mounted to a wheel to be assessed and being adapted to detect the condition of the wheel; wherein the antennas are arranged in a line along a path to be followed by a wheel to be assessed.

20 Claims, 5 Drawing Sheets

U.S. PATENT DOCUMENTS

| | | | |
|---|---|---|---|
| 2002/0171549 A1* | 11/2002 | Tanji et al. | 340/572.7 |
| 2003/0174099 A1* | 9/2003 | Bauer et al. | 343/893 |
| 2004/0239504 A1* | 12/2004 | Kalinin et al. | 340/572.5 |
| 2005/0110627 A1* | 5/2005 | Sabet et al. | 340/447 |

FOREIGN PATENT DOCUMENTS

| | | |
|---|---|---|
| EP | 1 245 412 A2 | 10/2002 |
| EP | 1352 764 A2 | 10/2003 |
| GB | 1 505 804 | 3/1978 |
| WO | WO 02/20287 A | 3/2002 |

* cited by examiner

▨ Antennas active in timeslot 1
▧ Antennas active in timeslot 2

REMOTE INTERROGATION OF A VEHICLE WHEEL

This application is a continuation of International Application No. PCT/GB2005/000349, filed Feb. 1, 2005, claiming priority to Great Britain Application No. 0402240.6, filed Feb 2, 2004.

The present invention relates to a method and apparatus for assessing the condition of a wheel particularly, but not exclusively, to a method and apparatus for assessing the condition of a tire rotating on a vehicle wheel.

The present invention provides apparatus according to the appended independent claim 1. An apparatus or system comprising further novel and advantageous features is defined in the appended dependent claims 2 to 20.

Embodiment of the present invention will now be described with reference to the accompanying drawings, in which.

Figure 1:
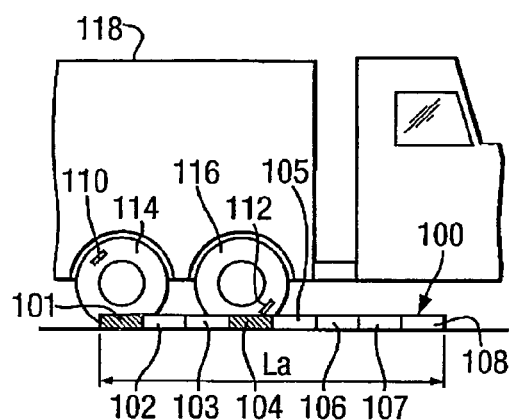
FIG. 1 is a schematic side view of a first embodiment of the present invention interrogating the tires of a truck and trailer vehicle.

The embodiments shown in the accompanying drawings operate to measure the condition of each tire on a vehicle (such as a truck and trailer road vehicle). Specifically, the embodiments are adapted to measure tire pressure and temperature. The embodiments are stationary systems which are mounted to a surface over which the vehicle to be interrogated is driven. Each of the tires of the vehicle is provided with a wireless passive sensor (preferably a wireless passive SAW resonant sensor) adapted for sensing pressure and temperature. Each tire may also be provided with an RF-ID tag so that a particular tire may be specifically identified. As the vehicle to be interrogated passes over the surface provided with an embodiment of the present invention, the wireless passive sensor and RF-ID tag located in each vehicle tire is interrogated and measurements of tire pressure and temperature for each tire are taken.

In the context of the present invention, a wireless passive sensor relates to any sensor based on a high-Q resonant structure or plurality of structures sensitive to physical quantities such as mechanical strain, temperature and moisture. The high-Q resonant structure or structures are capable of being coupled (i.e. connected directly or through a matching circuit) to an antenna. Examples of such structures are SAW (Surface Acoustic Wave) resonators, STW (Surface Transverse Wave) resonators, FBAR (thin Film Bulk Acoustic Wave) resonators and dielectric resonators. Furthermore, in the context of the present invention, a wireless passive SAW resonant sensor includes any sensor based on a piezo electric high-Q resonant structure or plurality of structures sensitive to physical quantities, coupled to an antenna and employing acoustic waves propagating along a surface of a substrate on which the structure is fabricated.

It will be apparent that there are several potential problems in using a stationary antenna for interrogating a wireless passive sensor mounted to a rotating tire which is moving transversely passed the antenna. It will be appreciated that the angular position of the sensor about the tire/wheel axis of rotation affects the accuracy of readings taken from an antenna. Indeed, the distance of the tire laterally from the antenna at the moment the tire passes the antenna also affects accuracy. In experiments, it has been found that, at a relatively large spacing (for a given tire diameter) between the tire and antenna as the tire passes the antenna (for example, 1 meter for a tire of approximately 1 meter diameter), the strongest return from the sensor in response to an interrogation signal from the antenna is found with the sensor located at the top of the wheel. In other angular positions of the sensor, the return signal is less strong. However, with a relatively small spacing (for given tire diameter) between the tire antenna as the tire passes the antenna (for example, 10 cm for a tire of approximately 1 meter diameter), the strongest signal returned from the sensor in response to interrogation from the antenna occurs with the sensor located at the bottom of the wheel. These experimental results relate to the case where the antenna is located outboard of the vehicle. However, it will be appreciated that larger vehicles make use of two wheels mounted to a single axle on each vehicle side. In these circumstances, the antenna for interrogating the inboard tire will be located directly under the vehicle body and, due to a signal shielding by suspension parts and other vehicle components, it has been found in experiments that the strongest return signal from a sensor is always found when the sensor is located at the bottom of the wheel (i.e. nearest the ground).

In order to address the above factors, the system shown in the accompanying drawings makes use of a plurality of antennas (rather than just a single antenna) arranged side by side in a line. This array of antennas is ideally arranged in a straight line so that a vehicle may conveniently drive in a straight path passed the system. However, the antennas may be arranged in a curved configuration if necessary. The total length La of the array is at least equal to the circumference of the or each tire to be interrogated. However, the number of antennas in the array may well vary depending upon the type of tire vehicle. In the embodiments shown in the accompanying drawings, an antenna array comprises a total of eight antennas. Given that the total length La of an antenna array is greater than or equal to the circumference of a tire to be interrogated, it will be appreciated that, as the vehicle moves passed the array, the sensor in each tire will locate at an optimum position for interrogation in relation to at least one of the eight antennas. The readings from this antenna may be used to obtain accurate measurements of tire pressure and temperature. The RF-ID tag associated with each tire passing the array will also be interrogated.

In order to minimise interference, the system is configured so that each antenna in an antenna array transmits a signal only when being passed by a tire to be interrogated. In other words, interrogation is performed using the antenna closest to the tire under consideration. In this way spatial and polarisation diversity is employed to separate the signals coming from different tires. If sufficient antennas are used, it is possible to guarantee that an acceptable reading will be obtained from at least one of the antennas in the array.

With reference to FIG. 1 of the accompanying drawings, a first array 100 of eight antennas 101, 102, 103, 104, 105, 106, 107, 108 is shown interrogating SAW devices 110, 112 respectively mounted to tires 114, 116 of a truck and trailer vehicle 118. It will be seen that the first antenna 101 in the array 100 is nearest to the second illustrated tire 114 and is therefore transmitting interrogation signals, whilst the fourth antenna 104 in the array 100 is nearest the first illustrated tire 116 and is therefore also transmitting interrogation signals. The remaining six antennas in the array 100 are not transmitting interrogation signals so as to minimise interference.

In order to ensure that the antennas of the first antenna array 100 are activated to send interrogation signals at the appropriate time as the tires 114, 116 of the vehicle pass, a wheel activated switch associated with each antenna is provided. These switches/sensors 120 (see FIG. 5) detect the presence of a wheel at a predetermined known location relative to a particular sensor. The switches 120 may be activated by a tire through mechanical, pneumatic or optical means. Ideally the switches 120 comprise a pneumatic hose which is pressed by a wheel to be assessed. Alternatively, the switches 120 may be activated using microwaves (radar) or may comprise any conventional proximity sensor.

Figure 5:
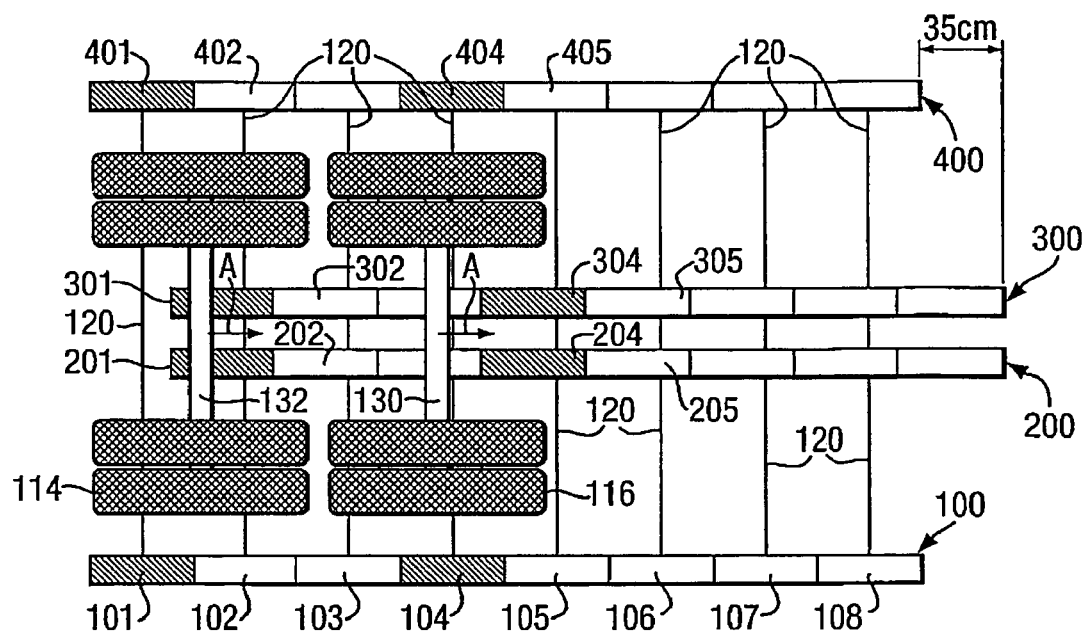
FIG. 5 is a schematic plan view of an arrangement of antenna arrays of a third embodiment of the present invention.

In the case of an outboard array for interrogating the outboard wheels of a vehicle (such as the first array 100 shown in FIG. 1), the system may be configured so that the switch 120 activate an antenna only when a tire becomes located directly opposite said antenna (as referred to above). However, for certain vehicles or for certain tire locations on a vehicle, the strongest return of an interrogation signal may be obtained by an antenna transmitting a signal before or after the tire to be interrogated located directly opposite the antenna. This is the case where an antenna is located so as to interrogate a tire from beneath a vehicle. As mentioned above, it may be appropriate to locate an antenna directly under a vehicle so as to facilitate interrogation of an inboard mounted tire. In such a case, it has been found that problems associated with interference from suspension and axle components can be minimised by activating an antenna before and/or after a tire passes the antenna. In the embodiment of FIG. 5, it will be seen that this is achieved by offsetting inboard arrays 200, 300 of sensors relative to the outboard arrays 100, 400 and associated switches 120. The offset is 35 cm for a conventional truck tire having approximately a 1 meter diameter. Thus, with vehicle movement as indicated by arrows A in FIG. 5, it will be seen that as the vehicle tires 114, 116 activate a switch 120 (for example, by the application of vehicle weight thereto) an outboard antenna located approximately directly opposite each outboard tire becomes activated and transmits interrogation signals. However, at the same time, an inboard antenna located 35 cm ahead of each activated outboard antenna is activated. As the vehicle progresses in the direction of arrows A, a further switch 120 will be operated and this has the effect of deactivating the previously active antennas 101, 201, 301, 401, 104, 204, 304, 404 and activating the next antenna 102, 202, 302, 402, 105, 205, 305, 405 along in each array 100, 200, 300, 400. Each antenna in each array will be activated in turn as the vehicle progresses in the direction of arrows A.

Figure 2:
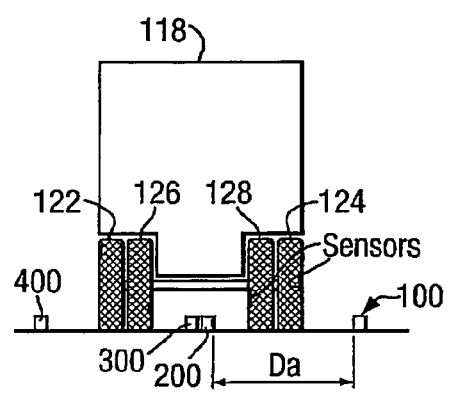
FIG. 2 is a schematic end view of the first embodiment interrogating the tires of a truck and trailer vehicle.

It will be understood therefore that one array of antennas is provided for each line of vehicle tires. Therefore, for a road vehicle such as a truck and trailer wherein each axle carries left and right outboard wheels 122, 124 and left and right inboard wheels 126, 128 (see FIG. 2), four lines of tires are present and four arrays are therefore provided. Each array will interrogate all passing tires in a particular line of tires. It will be understood that a tire measurement can be verified as belonging to a particular tire through reference to the RF-ID tag interrogated at the time of the measurement being taken.

Figure 4:
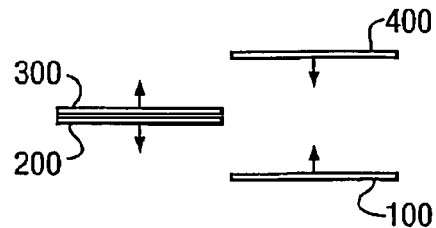
FIG. 4 is a schematic plan view of the arrangement of antenna arrays of a second embodiment of the present invention.

The offset antenna array configuration of FIG. 5 allows a single switch 120 to activate four antennas (one in each antenna array) and can also assist in reducing interference of interrogation signals. Interference may be further reduced by fully offsetting the outboard antenna arrays 100, 400 relative to the inboard antenna arrays 200, 300 as shown in FIG. 4. In this arrangement, as a vehicle passes the interrogation system, all antennas in the outboard arrays 100, 400 will be activated and only then will all the antennas in the inboard arrays 200, 300 be activated. Of course, depending on the configuration of the system and the direction of vehicle movement, all antennas of the inboard arrays 200, 300 may be activated before the antennas of the outboard arrays 100, 400. In the system of FIG. 4, a first set of switches may be used to activate the antennas of the inboard arrays 200, 300 whilst a second set of switches may be used to activate the antennas of the outboard arrays 100, 400.

Figure 3:
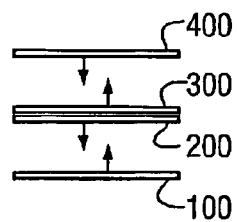
FIG. 3 is a schematic plan view of the arrangement of antenna arrays of the first embodiment.

Although the arrangement of FIG. 4 assists considerably in reducing interference of interrogation signals, the arrangement takes up twice as much room in terms of length. The space used may be minimised by exactly aligning all four antenna arrays side by side as in FIG. 3 rather than employing an offset configuration. However, in this arrangement, interference is not reduced to the extent found in the arrangement of FIG. 4 and separate switching for inboard and outboard arrays will be required in order to ensure the inboard antennas are activated before or after a passing of a wheel whilst, in contrast, the outboard antennas are activated as a wheel passes.

Figure 6:
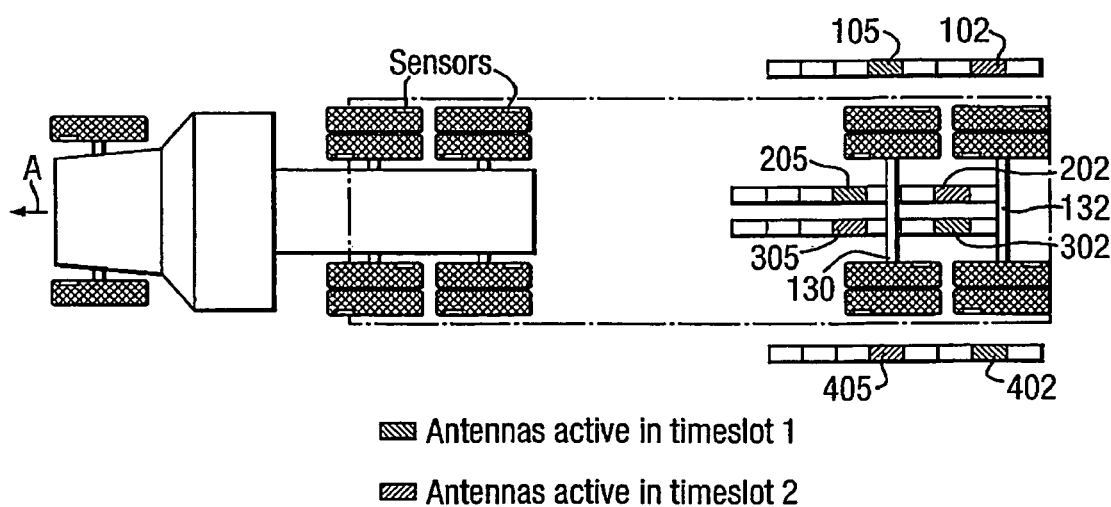
FIG. 6 is a schematic plan view of the arrays of the third embodiment in relation to tire sensors of a truck and trailer vehicle.

The scenario shown in FIG. 5 shows a total of eight tires (mounted onto axles 130, 132) giving rise to the activation of eight antennas. In FIG. 6 of the accompanying drawings, the two axles 130, 132 have moved forward relative to their position as shown in FIG. 5 and, in response to this movement and an associated operation of a switch 120, the previously activated antennas have become deactivated and the next antenna along in each array has been activated. In FIG. 6, eight antennas 102, 202, 302, 402, 105, 205, 305 and 405 are activated. Whilst activated, the antennas interrogate the sensors mounted to the either tires. This interrogation can be performed in a variety of ways. The simplest method is to interrogate all the sensors simultaneously. However, depending on the antennas used, there are situations where this may lead to significant problems of interference caused by the simultaneous reception of signals from neighbouring tires. An alternative method is to time division multiplex the interrogations of the multiple antennas such that, antennas which are most likely to cause problems of interference do not interrogate simultaneously. In other words, antennas which may present too strong a level of interference with one another can interrogate in different timeslots (i.e. at different times).

Figure 7:
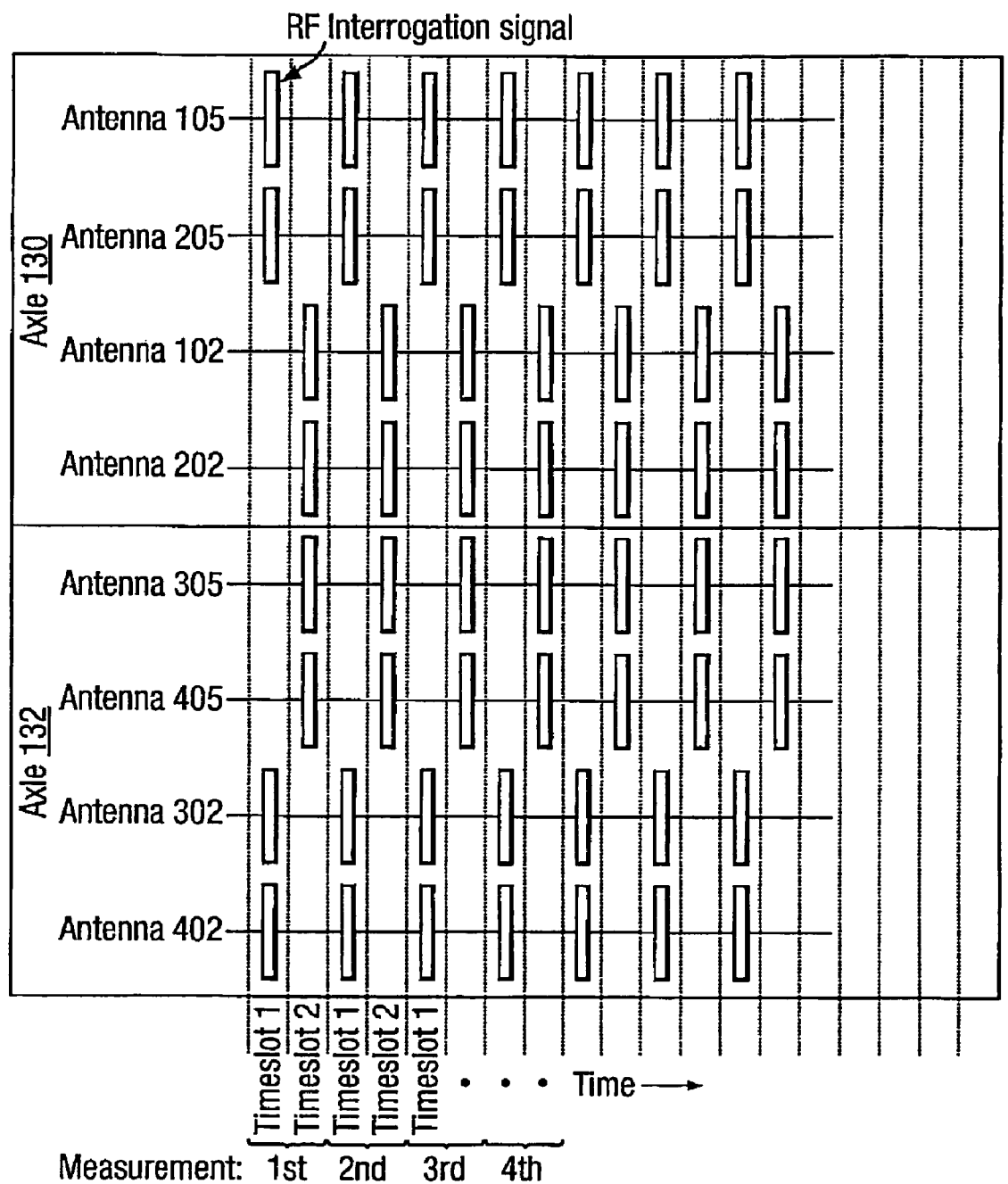
FIG. 7 is a diagram indicating the order in which the antennas shown in FIG. 6 are activated so as to minimise interference therebetween.

The simplest implementation of this time division interrogation is to have only one activated antenna transmitting/receiving at any given time. Nevertheless, the speed of interrogation will be increased if two or more sensors are interrogated simultaneously and FIG. 6, in combination with FIG. 7, illustrates an example of simultaneous interrogation wherein the eight antennas interrogate in two groups of four (in other words, at any given time, up to four antennas are simultaneously transmitting and receiving). The two groups of antennas shown in FIG. 6 have been selected so as to maximise the isolation between antennas transmitting/receiving in the same time slot. With reference to FIGS. 6 and 7, it will be seen that antennas 105, 205, 302 and 402 simultaneously transmit and receive the signals. This combination of antennas results in minimum interference. The second group of antennas 102, 202, 305 and 405 then transmits and receives signals. Again, this combination of antennas results in minimum interference. A first measurement of all eight tires in a given angular position is thereby taken. However, the process is then repeated so that multiple measurements are taken. For a vehicle moving at 3 miles per hour, it is anticipated that up to 40 measurements are taken by each antenna. The measurements from each array for a particular tire may then be interpreted so as to provide a final pressure and temperature reading. It will be understood that, because an array of antennas is provided, at least one antenna for each tire will be ideally positioned relative to the tire sensor so as to interrogate with optimum efficiency.

The antennas used in the aforementioned embodiments may be patch antennas, however dipole or loop antennas may also be used. Furthermore, the antennas do not need to be positioned above the road surface as schematically indicated in the accompanying drawings. Antennas may be embedded below the surface upon which the vehicle travels.

Figure 8:
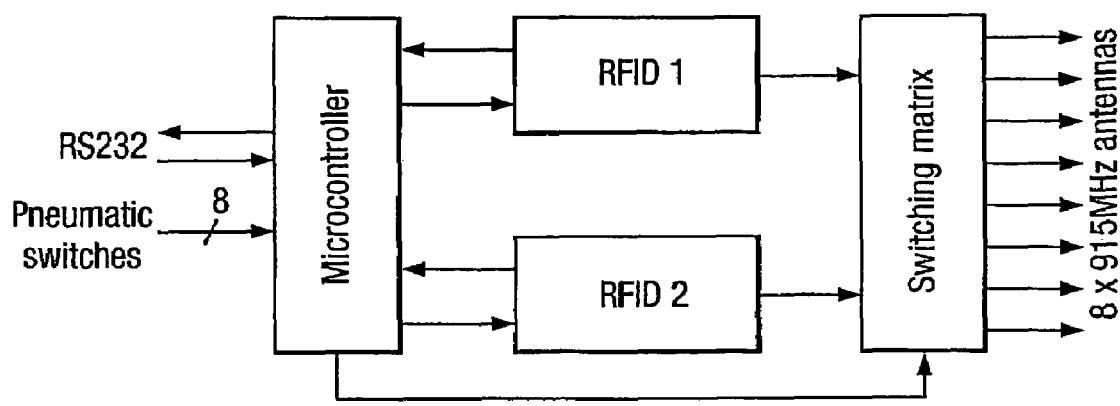
FIG. 8 is a schematic block diagram of an antenna switching system for RF-ID interrogation.
Figure 9:
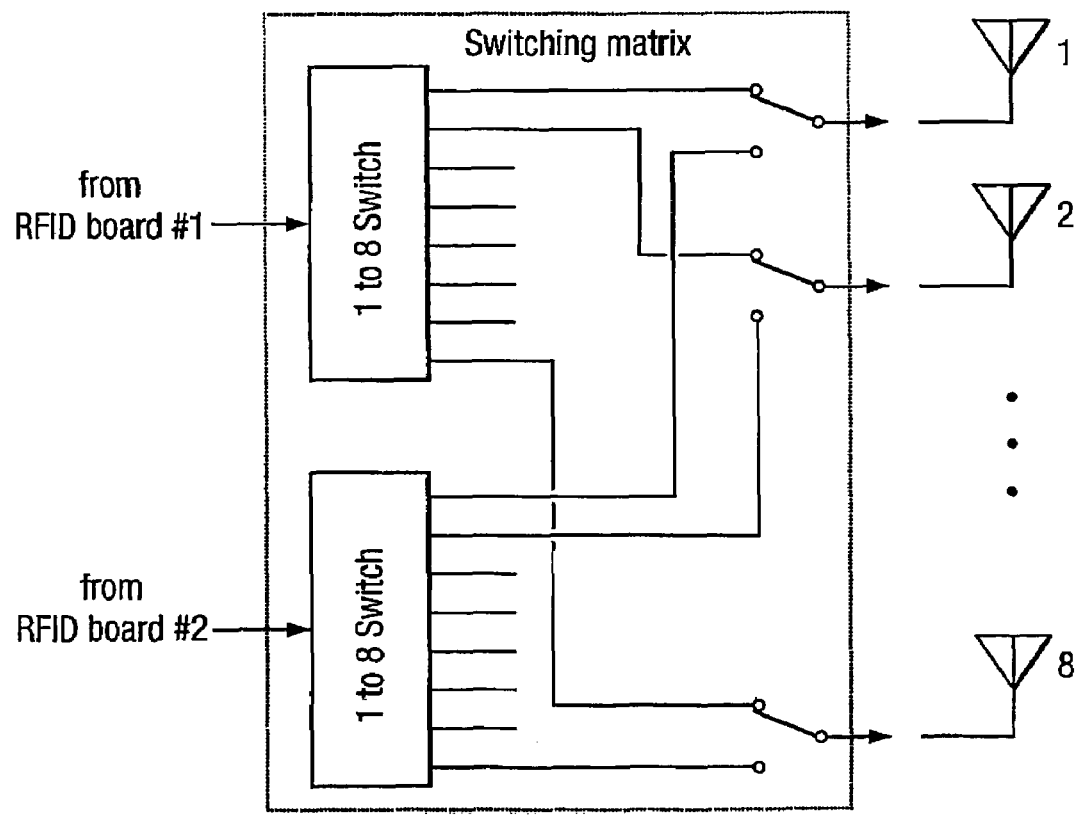
FIG. 9 is a schematic block diagram of the switching matrix used in the system of FIG. 8.
Figure 10:
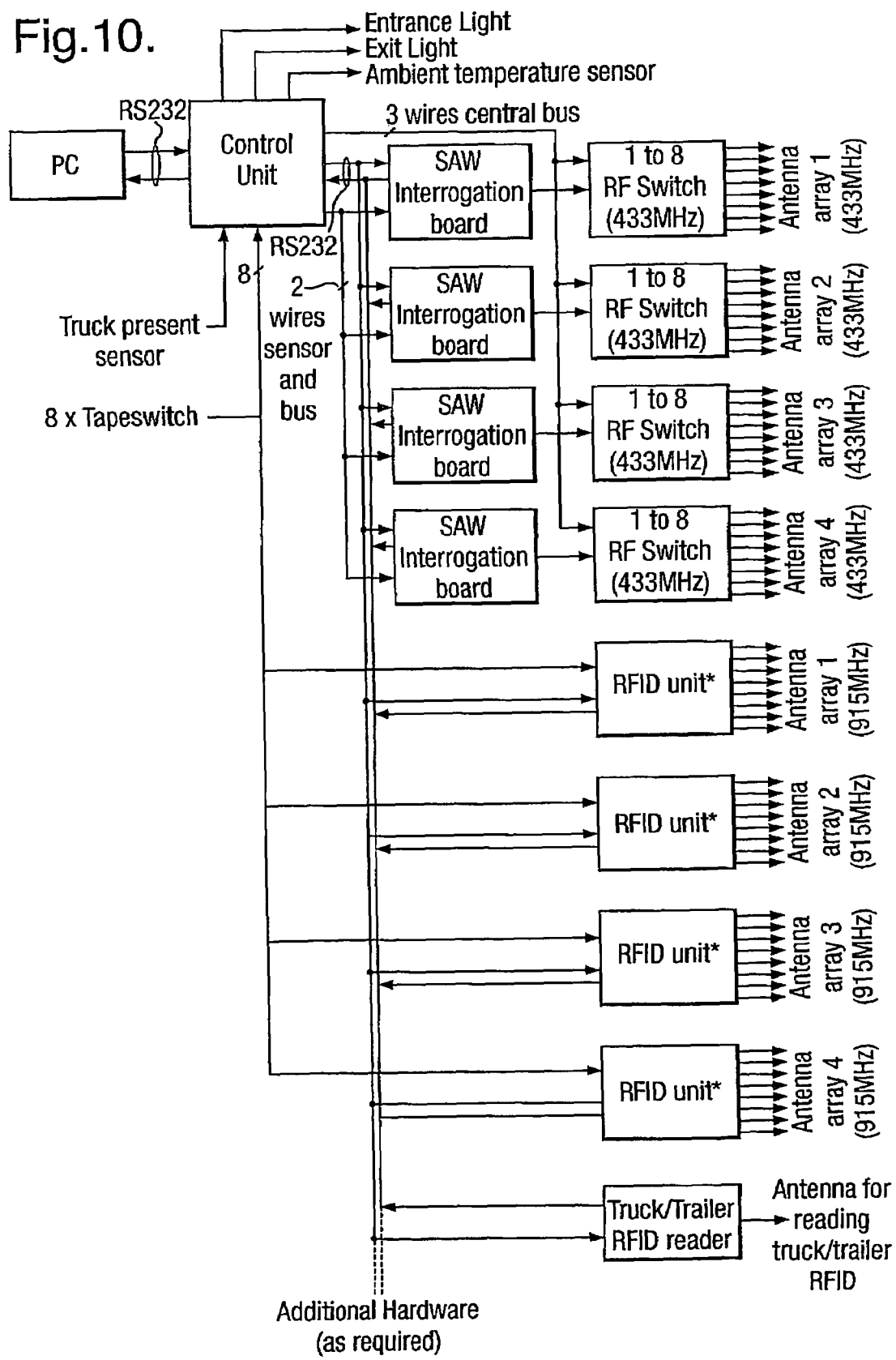
FIG. 10 is a schematic block diagram of the system layout in respect of the aforementioned embodiments.

If the total array length is 3.2 m and each array consists of 8 antennas, at a speed of 3 mph the maximum interrogation time of each antenna will be appropriately 300 ms (180 ms@5 mph). In the case of the passive sensor interrogation this is sufficiently long to time division multiplex the interrogation of two antennas. However, in the case of the RF-ID tag, this may not be a sufficient amount of time. In order to perform the same time division multiplexing of the RF-ID interrogation, the total interrogation time (including the time it takes to return the data via the RS232 line) must be no greater than 150 ms@30 mph (90 ms@3 mph). Experiments indicate that, with a conventional RF-ID reader, although an interrogation time of less than 150 ms is achievable in some situations, it may not be possible to guarantee this interrogation time. Nonetheless, using the antenna switching system shown in FIGS. 8 and 9, it should be possible to implement the system using two RF-ID boards per array. In this configuration, an RF-ID board will be triggered to begin searching for a tag each time a new axle enters the system, the pneumatic sensors will then be used to track the position of this axle through the arrays and automatically connect this board to the antenna directly opposite the tire. There should only be two axles present within the array at any given time and so the RF-ID boards will be dedicated to one axle each, and will automatically track that axle through the entire array by the antenna switching.

The present invention is not limited to the specific embodiments described above. Further arrangements will be apparent to those skilled in the art.

The invention claimed is:

1. An apparatus for assessing a condition of a wheel/tire assembly, the apparatus comprising a plurality of antennas arranged in a line along a path and in a direction to be followed by a wheel/tire assembly to be assessed for transmitting an interrogation signal to and receiving a response signal from a sensor while the wheel is moving past the antennas, the sensor being mounted to the wheel/tire assembly to be assessed and being adapted to detect the condition of the wheel/tire assembly, wherein the length of the line of antennas is at least equal to an outer circumference of the wheel/tire assembly to be interrogated.

2. The apparatus of claim 1, further comprising one or more switches activated by sensing a position of the wheel/tire assembly relative to each antenna, the one or more switches actuating the antennas as the wheel/tire assembly travels past the antennas, so that each antenna interrogates the sensor only when the wheel/tire assembly is at a predetermined position relative thereto, wherein the one or more switches activates only one antenna of a group associated with a particular wheel/tire assembly at a time, the other antennas of the group being deactivated.

3. The apparatus of claim 2, wherein the one or more switches activates the one antenna when the axle of the wheel/tire assembly to be assessed is directly laterally opposite the one antenna.

4. The apparatus of claim 2, wherein the one or more switches activates the one antenna when the axle of a wheel/tire assembly to be assessed is behind or in front of said one antenna along the line of antennas.

5. The apparatus of any one of claims 2 to 4, wherein the one or more switches are load sensitive and are activated, in use, by the application thereto of weight borne by the wheel/tire assembly to be assessed.

6. The apparatus of any of the preceding claims, wherein each antenna is adapted to transmit an interrogation signal to the sensor and to receive a response from the sensor, wherein the sensor comprises a wireless passive piezoelectric resonant structure.

7. The apparatus of any of the preceding claims, wherein at least one antenna is a unidirectional antenna.

8. The apparatus of claim 7, wherein said unidirectional antenna is a patch or Yagi-Uda array.

9. The apparatus of claim 7 or claim 8, wherein all the antennas are of the same type.

10. The apparatus of any one of claims 6 to 9, wherein each antenna is positioned at a height above the surface on which the assessed wheel/tire assembly rests such that each antenna is located within the ground clearance of the vehicle to which the assessed wheel/tire assembly is mounted.

11. The apparatus of any one of claims 6 to 10, wherein each antenna is positioned at a lateral distance from the path to be followed by the assessed wheel/tire assembly.

12. A system comprising one or more of the apparatus claimed in any of the preceding claims, wherein each antenna is individually connected to a separate channel of a multi-channel interrogation control unit common to all the antennas.

13. The system of claim 12, wherein the multi-channel interrogation control unit drives each antenna which has been activated in response to the position of a wheel/tire assembly, the control unit alternating the driving of activated antennas having associated signals which would otherwise interfere with one another.

14. The system of claim 13, wherein the multi-channel interrogation control unit comprises one transceiver for each plurality of antennas, and a radio frequency (RF) switch for each antenna which allows an antenna to be selectively connected to the associated transceiver.

15. The system of claim 14, wherein an antenna is activated in response to the position of a wheel/tire assembly by selectively connecting the antenna to the associated transceiver through use of the RF switch associated with the antenna.

16. The system of any one of claims 12 to 15, wherein the multi-channel interrogation control unit is adapted to (i) radiate an RF interrogation signal from a successive one of a plurality of antenna so as to excite a natural oscillation in an associated sensor (110, 112) of a wheel/tire assembly to be assessed; (ii) receive a signal generated by the sensor oscillation; (iii) estimate the amplitude and frequency of the received signal; and (iv) determine the average frequency value for signals received from the plurality of antenna.

17. The system of claim 16, wherein only frequency values satisfying predetermined criteria are averaged.

18. The system of any one of claims 12 to 17, wherein the plurality of antennas of each apparatus is laterally spaced from the plurality of antennas of the or each other apparatus.

19. The system of claim 18, wherein first, second, third and fourth pluralities of antennas are provided; the first and fourth pluralities of antennas being located so as to allow a vehicle having a wheel/tire assembly to be assessed, to pass therebetween; and the second and third pluralities of antennas being located so as to allow a wheel/tire assembly of said vehicle to pass either side thereof.

20. The system of claim 19, wherein the first and fourth pluralities of antenna are offset longitudinally relative to the second and third pluralities of antenna.

* * * * *